FIG. 1

INVENTORS S. W. BAKER
F. W. SCHWAB
BY
ATTORNEY

FIG. 2

INVENTORS S. W. BAKER
F. W. SCHWAB
BY
*B. B. Stoddard*
ATTORNEY

April 25, 1961 S. W. BAKER ET AL 2,981,452
METHOD OF AND MEANS FOR CONTINUOUSLY PASSING CABLE
INCLUDING RIGID HOUSINGS THROUGH A
CATERPILLAR CABLE ENGINE
Filed June 18, 1958 6 Sheets-Sheet 3

INVENTORS S. W. BAKER
F. W. SCHWAB
BY
ATTORNEY

INVENTORS S.W. BAKER
F.W. SCHWAB
BY
Stoddard
ATTORNEY

April 25, 1961 S. W. BAKER ET AL 2,981,452
METHOD OF AND MEANS FOR CONTINUOUSLY PASSING CABLE
INCLUDING RIGID HOUSINGS THROUGH A
CATERPILLAR CABLE ENGINE
Filed June 18, 1958 6 Sheets-Sheet 5

FIG.8

INVENTORS S.W. BAKER
F.W. SCHWAB
BY
Stoddard
ATTORNEY

United States Patent Office 2,981,452
Patented Apr. 25, 1961

2,981,452

METHOD OF AND MEANS FOR CONTINUOUSLY PASSING CABLE INCLUDING RIGID HOUSINGS THROUGH A CATERPILLAR CABLE ENGINE

Stanley W. Baker, Ramsey, and Fredric W. Schwab, Maywood, N.J., assignors to Bell Telephone Laboratories, Incorporated, New York, N.Y., a corporation of New York Filed June 18, 1958, Ser. No. 742,927

6 Claims. (Cl. 226—1)

This invention relates to a method of, and means for, continuously passing cable including rigid housings through a caterpillar cable engine. In particular, the invention relates to a method of, and means for, programming the passage of rigid instrumentality housings through a caterpillar cable engine at normal cable-handling speeds. The invention is applicable to various types of cables and, although it may be used with armored cable, is is especially suitable for use with armorless cable. The invention is particularly useful when it is applied to the laying of underwater or undersea communication cable which is also known as submarine cable or ocean cable.

In laying a long undersea cable, such as a transatlantic telephone cable extending for a distance of about 3000 miles, the customary procedure is to fabricate the cable in long sections each having a length of around 200 miles. These long cable sections, known as "ocean blocks," are stowed in the hold of a cable-laying ship which carries them to the points where they are to be laid. At these points, an end of an ocean block of cable which is being carried by the ship is joined to the buoyed end of a cable section which has been previously laid on the bottom of the ocean. After this has been done, the ship proceeds on its course with the cable being pulled from the hold onto the deck where it is payed out into the ocean.

One method of transferring the cable from the ship's hold into the ocean utilizes a drum around which the cable is wrapped several times. This method of laying the cable has been satisfactory when it has been applied to armored cable. However, if this method were to be applied to armorless cable having an outer covering of a suitable plastic material, such as polyethylene, there would be the hazard that the plastic outer coating might not be able to withstand the concentrated radial strain imposed by the drum and might become cracked. Furthermore, if the cable should be of the coaxial type, there would be the additional danger that the force exerted by the conveyor drum might deform the concentric conductors and thereby produce impedance discontinuities.

Therefore, it is desirable that shipboard handling of armorless cable be performed by a caterpillar cable engine having a multiplicity of oppositely disposed gripper blocks arranged in lower and upper endless track formations. Thus, the total gripping force exerted by the cable engine is distributed over the individual gripper blocks so that the gripping area of each block is responsible for only a fraction of the total force. A further advantage of this type of engine is that it imposes no bending force because the cable passes through it along a path of travel which is essentially a straight line.

As is well-known in the art, a long undersea telephone cable is usually provided with integral lumps at spaced intervals along its length. These lumps are constituted by instrumentality housing structures which may be of either flexible or rigid construction and which contain electrical equipment, such as repeaters or equalizers. The spacing between these lump-type repeaters varies with the frequency bandwidth of the electrical signaling waves transmitted over a particular cable. This is due to the fact that an increase in the frequency bandwidth of the signaling waves produces an increase in the energy loss over a given distance thereby necessitating a reduction in the spacing between the repeaters. For example, in the past, the signaling frequencies have been such that a repeater spacing of around fifty miles has been adequate, but in a recently developed broadband undersea telephone cable system having signaling frequencies in the order of one megacycle, a repeater spacing of about ten miles is required.

Heretofore, when undersea cable having a repeater spacing in the order of fifty miles was being laid by means of either a drum or a caterpillar engine, the cable-laying operations were temporarily suspended whenever a rigid repeater was to be laid. This was due to the fact that the repeaters were too large to pass either around the drum or to be fed through the caterpillar engine. Accordingly, one method that has been utilized in laying a repeater comprised stopping the progress of the cable-laying ship and also stopping the drum or caterpillar engine. The cable and its repeater were then guided by several men overboard into the ocean. It was then necessary either to rewind the cable around the drum or to grasp it again with the caterpillar engine before the ship could proceed on its course.

This method of laying repeaters possesses several objectionable features. Firstly, it imposes extra labor upon the personnel carried by the ship. Secondly, considerable time is consumed in stopping the cable-laying ship on each occasion that a repeater is laid. Thirdly, when the cable-laying process is halted for any substantial period of time, kinks are liable to form in that portion of the cable extending from the ship to the bottom of the ocean. It can be understood that this last-mentioned hazard is particularly liable to occur when the cable-laying operations are taking place in water that is several miles deep.

These objectionable features would become multiplied fivefold if cable having a repeater spacing of around ten miles should be laid in the manner described above.

Accordingly, it is an object of this invention to provide an improved cable-handling facility which will operate continuously at normal cable-handling speeds on both a cable and its integral lump-type housing structures.

It is also an object of the invention to provide a caterpillar cable engine with means for "swallowing" or encompassing both a cable and its integral lump-type housing members while continuously operating at normal cable-handling speeds.

An additional object of the invention is to provide a caterpillar cable engine with programming means for enabling rigid repeaters to pass through the engine at normal cable-handling speeds.

A further object of the invention is to provide a caterpillar cable engine with means for causing its loading units to relax their hold seriatim in synchronism with the passage of a rigid repeater through the engine at normal cable-handling speeds.

Another object of the invention is to provide a caterpillar cable engine with means for producing a wave of release of the pressure exerted by its loading units, this wave being synchronized with the travel of a rigid housing through the engine at normal cable-handling speeds.

Still another object of the invention is to provide a caterpillar cable engine with means for mechanically creating intermittently a moving gap between its oppositely disposed tracks for accommodating a rigid housing moving therethrough at normal cable-handling speeds.

These and other objects of the invention are attained in an improved caterpillar cable engine by providing programming means operating at normal cable-handling speeds for enabling the lump-type housing members to pass through the engine at the same speed as the cable. One method of accomplishing this result comprises employing a multiplicity of short caterpillar cable-handling units instead of a single long caterpillar cable engine. For example, ten or fifteen cable engine units may be disposed in tandem and provided with programming means operating at normal cable-handling speeds for relaxing the pressure of the mating tracks of each sectional engine unit seriatim in synchronism with the travel of a housing member therethrough. Another method includes using a single long caterpillar cable engine having means for producing a wave of release of the pressure exerted by its loading units. This wave of release is programmed in such a manner as to travel along the mating tracks coincidently with the passage of a housing structure through the engine.

If it be assumed that the loading of the cable-gripping blocks is performed by means including a multiplicity of air springs, then one way in which the desired programming operations could be effected for either of the two methods mentioned above would be to employ a timing system for progressively reducing the air pressure in the individual air springs in synchronism with the travel of a housing member. In accordance with this arrangement, an approaching housing structure would actuate a sensing device which, in turn, would operate a commutator switch having sector wipers for electrically controlling three-way valves associated with the air springs and their air manifold systems.

Another programming concept is based upon the principle of applying direct force by means of a mechanical system that momentarily forces a small section of both the loading units and the gripping blocks out of the way so as to provide virtually free passage for a housing structure without releasing the load imposed upon the cable. This temporary sectional displacement of the caterpillar tracks is effected by traveling cam means mounted for movement along a track which is closely parallel to the mating caterpillar tracks so that the passage of the cam means incrementally forces the oppositely disposed loading units apart seriatim thereby sequentially compressing their associated air springs. The movement of the cam means is initiated when an approaching housing member actuates a sensing device, such as a trip switch, in a synchronized control system which causes the cam means to travel through the engine coincidently with the housing member at normal cable-handling speeds. Since the central contour of the cam means is designed to be essentially the same as a longitudinal section of the housing member, the movement of the cam means between the lower and upper caterpillar tracks creates a moving gap which provides the housing member with unimpeded passage through the cable engine. Shortly after the housing member emerges from the cable engine, it operates another sensing device, such as another trip switch, thereby causing the drive system to effect the movement of the cam means back to the initial position.

Thus, a housing member can pass freely through the cable engine without causing any reduction in the speed of the cable-handling operation. It is to be noted that, during the passage of a housing member through the engine, complete control of the cable is maintained due to the fact that the pressure exerted by the cable-gripping blocks is not completely removed, but is momentarily displaced for only that portion of the caterpillar tracks between which the cam means and the housing member are moving. In other words, the cable-gripping blocks exert pressure continuously upon the portions of the cable immediately preceding and immediately following the cam means.

The cam means may be constituted by one long cam or may comprise more than one cam. For example, one long cam could be mounted on a track parallel to one edge of the caterpillar track and another long cam could be similarly mounted on a second track parallel to the other edge of the caterpillar track. The cam means may be so constructed as to be removable so that, when housing structures having different shapes are to pass through the cable engine, they may be readily accommodated by simply substituting cams having corresponding contours.

These and other features of the invention are more fully discussed in connection with the following detailed description of the drawing in which.

Figure 1:
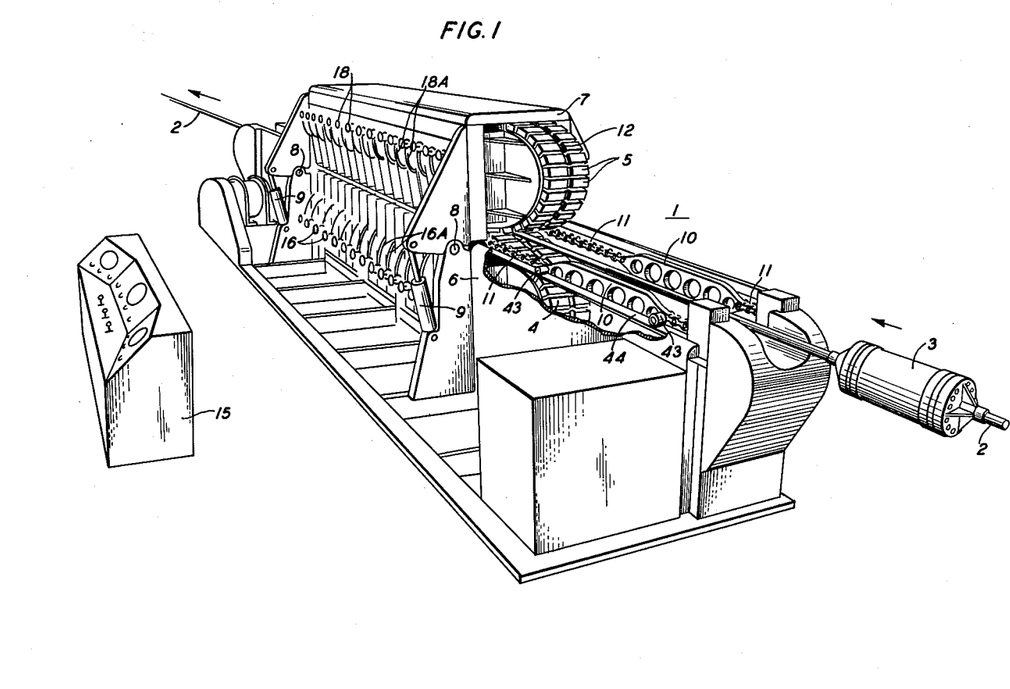
Fig. 1 is a perspective view of an improved caterpillar cable engine operating in accordance with this invention upon a cable having integral lump-type rigid housing members.

In Fig. 1 a caterpillar cable-handling engine 1 is shown to be operating upon a cable 2 having integral lump-type rigid instrumentality housing members 3 of a markedly greater diameter than that of the cable 2. In the particular embodiment of the invention illustrated in the drawing, the cable 2 is of the coaxial armorless type having an outer coating of a suitable plastic material, such as polyethylene. The outside diameter of the cable 2 is about one and one-quarter inches. The rigid instrumentality housing structures 3 contain electrical equipment, such as repeaters or equalizers, and are fabricated of appropriate material, such as beryllium copper. Each of the housing structures 3 has a length of the order of four feet and an outside diameter of about one foot.

As is indicated in the drawing, the cable-handling engine 1 is provided with a first multiplicity of cable-gripping blocks 4 connected in a lower endless track formation and a second multiplicity of cable-gripping blocks 5 arranged in an upper endless track formation. These lower and upper caterpillar track formations of gripper blocks 4 and 5 are oppositely disposed with respect to each other with the lower assembly of gripper blocks 4 being mounted within a steel chassis structure 6 and the upper group of gripper blocks 5 being retained within another steel body structure 7. The upper body structure 7 is pivotally attached to the lower chassis structure 6 by means of hinges 8 so that it can be moved upward in order to provide access to the interior of the engine 1. Due to the weight of the upper body structure 7, two power-operated jacks 9 are provided for effecting its movement.

The cable 2 passes through the engine 1 by traveling between the mating section of the track formations of gripping units 4 and 5. Each of the gripper blocks 4 and 5 is formed with a groove 12 therein for pressure equalization and also for maintaining the centering of the cable 2 during its travel through the engine 1. Control of the movement of the cable 2 is effected by the gripping action of the blocks 4 and 5 which have their respective track formations driven or restrained by large sprocket wheels, such as the sprocket wheel 13 shown in Fig. 6 and the sprocket wheel 14 shown in Fig. 7. These sprocket wheels 13 and 14 are operated by any suitable source of power, such as an hydraulic system driven by electric motors. This power source is designed to function as a drive motor in one direction for recovery operations and as a pump in the other direction for use as a brake during laying operations. The power source is further arranged to act as a drive motor in the laying direction for the purpose of pulling cable from the ship's hold until sufficient cable has been overboarded to pull its own weight. A control console 15 is associated with the engine 1 for providing a convenient location for the various instrumentalities which are used in controlling the operation of the engine 1.

In addition, the cable-handling engine 1 is further equipped with programming means including two traveling cams 10 which are intermittently pulled through the engine 1 by respectively associated endless chains 11 for the purpose of producing a wave of release of the pressure exerted by the mating section of the lower and upper caterpillar tracks 4 and 5 thus providing each housing member 3 with unimpeded passage through the engine 1 as is more fully discussed hereinafter. It is to be noted that the engine 1 is so designed as to cause the mating track section to have a length which includes a sufficient number of the gripper blocks 4 and 5 for adequately gripping and controlling the cable even though some of them are moved out of the way during the passage therethrough of a housing member 3. In this embodiment of the invention, the mating track section has a length of approximately twenty feet.

The degree of the gripping action of the blocks 4 and 5 is regulated by adjustment of a pressurized air manifold system 16 connected by a group of flexible hoses 16A to a multiplicity of discrete pneumatic loading units 17 associated with the lower track formation of blocks 4, and also by adjustment of a second pressurized air manifold system 18 connected by another group of flexible hoses 18A to a second multiplicity of discrete pneumatic loading units 19 associated with the upper track formation of blocks 5. These pneumatic loading units 17 and 19 constitute resilient means for biasing the gripping blocks 4 and 5 toward each other. As is described in detail hereinafter, the loading units 17 and 19 in this embodiment of the invention are fixedly located and are constituted by short air springs 28 which are assembled in pairs as is shown in various parts of of the drawing, such as in Figs. 4 and 6. The manner in which these loading units 17 and 19 are associated with the oppositely disposed lower and upper track formations of gripper blocks 4 and 5 is illustrated in Fig. 2.

Figure 2:
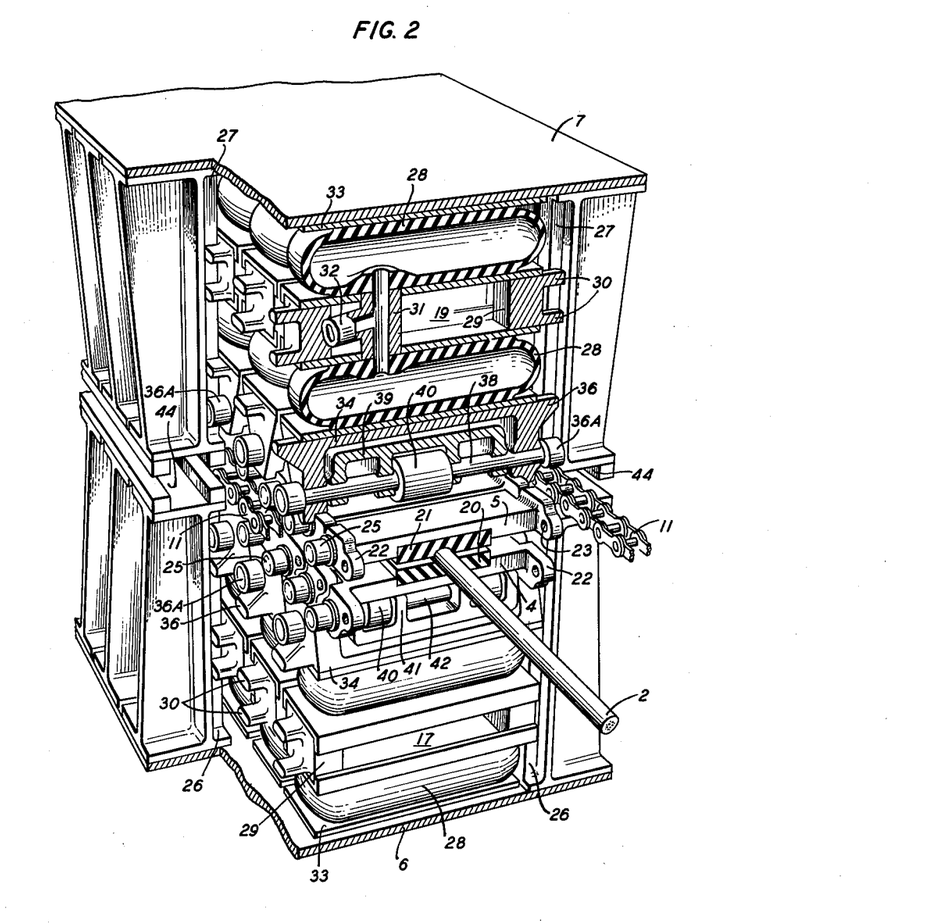
Fig. 2 is a three-dimensional view partly in section of a portion of the caterpillar cable engine showing the manner in which the oppositely disposed lower and upper caterpillar tracks of the cable engine are provided with a multiplicity of vertically displaceable discrete loading units each having directionally flexible load transfer means.
Figure 3:
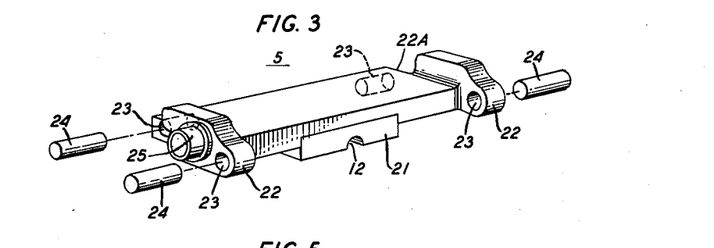
Fig. 3 is a three-dimensional view of one of the cable-gripping blocks in the upper caterpillar track.

In Fig. 2, the cable 2 is represented as being held between the lower gripper blocks 4 and the upper gripper blocks 5. The blocks 4 and 5 comprise aluminum castings provided with molded rubber inserts 20 and 21, respectively. Each of the rubber inserts 20 and 21 is formed with a groove 12 in its face, as is also shown in Fig. 3, for mating with the contour of the cable 2. These grooves 12 perform two functions as was mentioned above. Firstly, they aid in maintaining the centering of the cable 2 during its passage through the engine 1. Secondly, they assist in equalizing the contact pressure exerted by the blocks 4 and 5 in a direction normal to the cable 2 thereby lessening the possibility of this armorless cable 2 becoming damaged while traveling through the engine 1.

In order to join the gripper blocks 4 and 5 into lower and upper endless track formations, each end of the blocks 4 and 5 is formed with an integral link portion 22 and a recessed portion 22A as is best seen in Fig. 3. These portions 22 and 22A are each provided with a hole 23 therein for receiving a steel link or hinge pin 24. Each link portion 22 is so shaped as to overlap and to mate with a recessed portion 22A of an adjacent gripper block in the same track formation in such a manner that their holes 23 will be in alignment. Due to this overlapping and mating arrangement, each hinge pin 24 passes through a hole 23 in each of two adjacent gripper blocks thereby pivotally joining them. Thus, by means of this construction, all of the lower gripper blocks 4 are connected into one endless track formation and all of the upper gripper blocks 5 are connected into another endless track formation.

Figure 6:
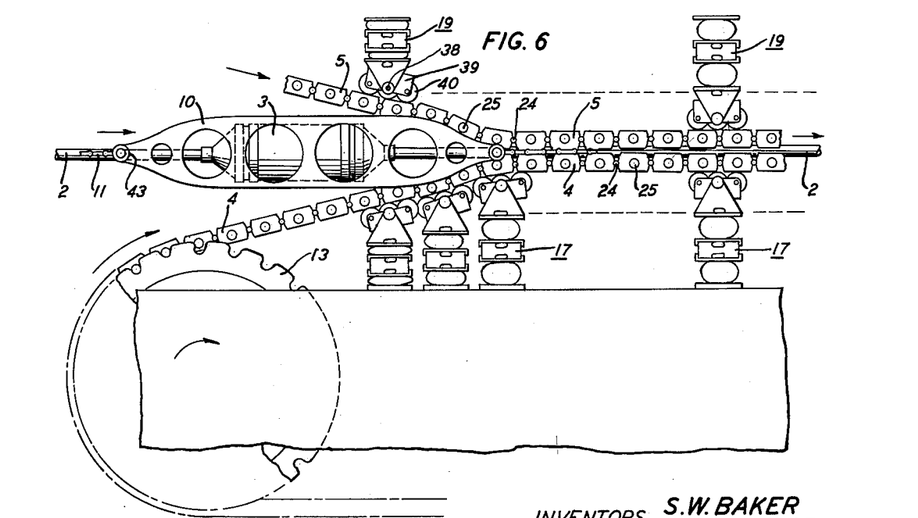
Fig. 6 is a schematic representation of a portion of the caterpillar cable engine showing one of the housing members entering the engine coincidently with the programming cam means.
Figure 7:
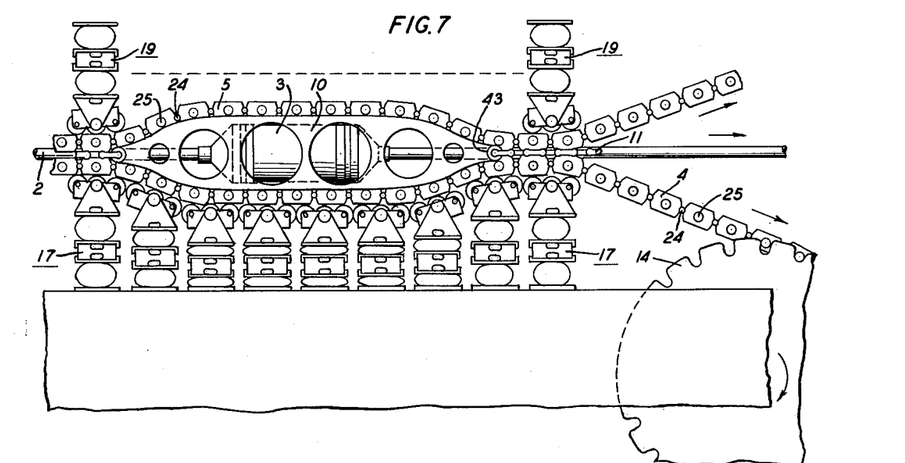
Fig. 7 is a schematic representation of a portion of the cable-handling engine showing one of the housing structures completely engulfed in the moving gap created between the oppositely disposed caterpillar tracks by the traveling cam means.

As was stated above, the lower and upper endless track formations of gripper blocks 4 and 5 are driven by large sprocket wheels, such as the sprocket wheel 13 shown in Fig. 6 and the sprocket wheel 14 shown in Fig. 7. This is accomplished by mounting a flanged roller 25 at each end of each of the blocks 4 and 5. These rollers 25 are of such a size as to enable them to fit between the teeth of the sprocket wheels in the manner represented in Figs. 6 and 7. For the purpose of simplifying the drawing, only the sprocket wheels 13 and 14 associated with one side of the lower track formation of gripper blocks 4 have been shown in Figs. 6 and 7. It is to be understood that two similar sprocket wheels are associated with the other side of the lower track formation of blocks 4 for co-acting with the rollers 25 projecting therefrom. It is to be further understood that the upper track formation of gripper blocks 5 is driven in a comparable manner by four other sprocket wheels which are similar to the sprocket wheels 13 and 14.

In order to enable the caterpillar cable engine 1 to be used either for laying cable or for recovering cable that has been previously laid, the power supply for the engine 1 is so designed that the direction of rotation of the above-mentioned sprocket wheels can be reversed by manually operating appropriate control switches mounted in the control console 15. Due to this arrangement, the lower and upper track formations of gripper blocks 4 and 5 can be driven in either a forward or a reverse direction. For example, at the start of the laying of a cable section, its front portion is pulled from the ship's hold by driving the sprocket wheels in a clockwise direction, as is indicated in Figs. 6 and 7, thereby causing the lower and upper caterpillar tracks to be driven in the direction of the arrows shown in Figs. 6 and 7. After a sufficient length of cable has been overboarded to pull its own weight, a plurality of selector valves are operated from the control console 15 for causing the power system to cease functioning as a drive motor in that direction and to operate as a pump in the other direction for use as a brake during subsequent passage of the cable 2 through the engine 1. When it is desired to recover cable that has been previously laid, proper operation of the selector valves will cause the power system to function as a drive motor for driving the sprocket wheels in a counter-clockwise direction so that the lower and upper caterpillar tracks will be driven in a direction opposite to that in which the arrows of Figs. 6 and 7 are pointing.

During the movement of the lower and upper caterpillar tracks, the gripping action of the blocks 4 and 5 is continuously maintained by pressure produced by the above-mentioned pneumatic loading units 17 and 19, the lower units 17 being mounted beneath the lower track formation of blocks 4 on the lower steel chassis structure 6 and the upper units 19 being retained above the upper track formation of blocks 5 by the upper body structure 7. At this point, the construction of the pneumatic loading units 17 and 19 will be explained with particular reference to Fig. 4 which illustrates one of the lower loading units 17 that is typical of all of the loading units 17 and 19.

Figure 4:
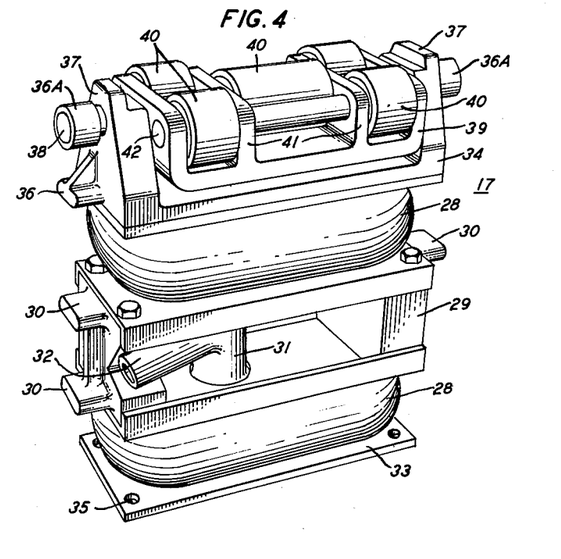
Fig. 4 is a three-dimensional view of one of the loading units and its directionally flexible load transfer means.

In Fig. 4, the loading unit 17 is shown to comprise two short air springs 28 of any appropriate material, such as a combination of rubber and fabric. The air springs 28 are suitably mounted in tandem on a metallic spacing member 29 having two protuberances or studs 30 projecting from each of its ends. The studs 30 are so constructed as to slide up and down in vertical channels 26 formed in the lower chassis structure 6, as is shown in Fig. 2, for the purpose of providing longitudinal constraint for the assembly of air springs 28. Thus, the studs 30 function as stabilizing or aligning guides during the alternate periods of compression and expansion of the air springs 28 that are caused by the passage of the cams 10 through the engine 1 as is more fully discussed hereinafter.

The two air springs 28 are interconnected by a hollow member 31 which is mounted within the spacing member 29. This interconnecting member 31 is T-shaped in order to provide a convenient input termination 32 for connection to one of the flexible hoses 16A in the lower air manifold system 16 which is shown in Fig. 1. It is to be understood that the air springs 28 in the upper loading units 19 are connected in a similar manner to the flexible hoses 18A of the upper air manifold system 18.

The loading force applied to the cable 2 by the air springs 28 in the lower and upper loading units 17 and 19 can be varied as desired by changing the pressure of the air supplied through the lower and upper manifold systems 16 and 18. In this embodiment of the invention, the air manifold systems 16 and 18 are adjusted to provide a pressure of about twenty pounds per square inch in each of the air springs 28.

These groups of air springs 28 become compressed seriatim when the cams 10 pass through the engine 1 as is described in detail hereinafter. Thus, the loading units 17 and 19 will, due to their resilient construction, become vertically displaced by an amount sufficient to permit the unimpeded passage of a rigid housing 3 through the engine 1. For example, if each of the housings 3 has a maximum diameter of about one foot, then each of the air springs 28 in the lower and upper loading units 17 and 19 should be capable of a compressional displacement of approximately three inches.

In Fig. 4, it can be seen that, in addition to being mounted upon the spacing member 29, the lower air spring 28 is also mounted upon a flat metallic plate 33 while the upper air spring 28 supports a saddle member 34. The plate 33 is provided with holes 35 near its corners so that it can be bolted to the lower chassis structure 6 for the purpose of preventing the position of the loading unit 17 from being shifted laterally, such as might otherwise occur during the passage of the cams 10 through the engine 1. Each end of the saddle member 34 is provided with a protuberance or stud 36 and a roller 36A projecting therefrom, both being so constructed as to slide up and down in the above-mentioned vertical channels 26. Thus, the studs 36 and the rollers 36A assist the studs 30 in aligning and stabilizing the loading unit 17 during its downward and upward motion resulting from comprission and expansion of the air springs 28.

The saddle 34 is formed with lugs 37 at each end for receiving a pivot shaft 38 which, in addition to having the rollers 36A rotatably mounted on its ends, also supports a truck member 39 in such a manner that it can tilt or rock back and forth. The truck member 39 carries a plurality of rollers 40 which are rotatably mounted thereon in such a manner as to bear against the lower track formation of gripper blocks 4, as is indicated in Fig. 2. Due to this construction, the loading force exerted by the lower and upper air springs 28 in the lower loading unit 17 is transferred by the rollers 40 to the lower gripper blocks 4 thereby producing a gripping action upon the cable 2. In other words, the truck 39 and its assembly of rollers 40 constitute pivoted load transfer means for providing directional flexibility in the application of the loading force to the lower track formation of gripper blocks 4. This is of particular utility during the passage of the cams 10 through the engine 1 because it assists in causing the caterpillar tracks to conform to the contour of the cams 10 as is more fully discussed hereinafter.

For the purpose of effecting an evenly distributed transference of the loading force produced by the loading units 17 and 19, it is preferable to mount a number of rollers 40 on each truck 39 instead of merely one or two rollers. Accordingly, each truck 39 is formed with two intermediate lugs 41 for separating the rollers 40 into three groups. In Fig. 4, it can be seen that two short rollers 40 are rotatably mounted on shafts 42 between the left end of the truck 39 and the first lug 41; one long roller 40 is rotatably mounted on the pivot shaft 38 between the two lugs 41; and two other short rollers 40 are rotatably mounted on the shafts 42 between the second lug 41 and the right end of the truck 39. All of the rollers 40 have the same diameter, but the length of the long roller 40 is equal to the combined lengths of two of the short rollers 40.

In order for the rollers 40 of one loading unit 17 to be mounted as closely as possible to corresponding rollers 40 in an adjacent loading unit 17, the rollers 40 of the adjacent loading unit 17 are mounted on their truck 39 in a manner different from that described above. This mounting arrangement is illustrated in Fig. 5 which shows schematically some of the trucks 39 and their rollers 40.

Figure 5:
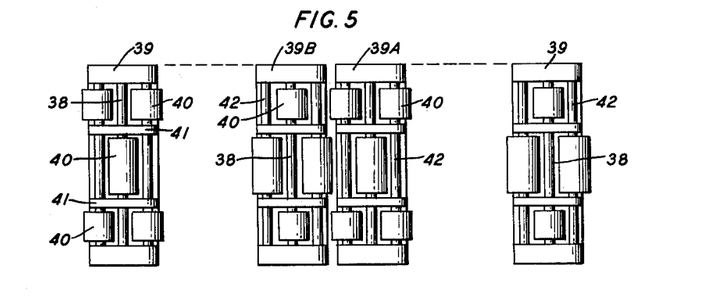
Fig. 5 is a top view of some of the trucks and rollers that are a part of the directionally flexible load transfer means associated with the loading units.

In Fig. 5, one of the trucks, which is designated 39A, has its rollers 40 disposed in the manner shown in Fig. 4 and described above. The adjacent truck, which is designated 39B, has its rollers 40 differently arranged in that each of its end sections has one short roller 40 rotatably mounted on its pivot shaft 38 while its middle section has two long rollers 40 which are each rotatably mounted on a respectively different one of its shafts 42. For the purpose of simplicity, the other trucks 39 which are immediately adjacent to the trucks 39A and 39B have not been shown in Fig. 5. However, it is to be understood that the truck which is adjacent to the left side of the truck 39B has its rollers mounted in the same manner as those carried by the truck 39A while the truck adjacent to the right side of the truck 39A has its rollers disposed in the same fashion as those on the truck 39B.

As is shown in Fig. 5, each of the long rollers 40 is spaced apart from the next long roller 40 by either a pivot shaft 38 or a shaft 42, and each of the short rollers 40 is similarly separated from the next short roller 40 by either a pivot shaft 38 or a shaft 42. The diameter of one of the pivot shafts 38 is equal to the diameter of one of the shafts 42 but these diameters are considerably smaller than the diameter of one of the rollers 40. This difference in diameters together with the close spacing of the rollers 40 causes a certain amount of longitudinal overlapping of the short rollers 40 with the long rollers 40 which produces an overall semi-interlocking effect. Due to this arrangement of the rollers 40, each of the gripper blocks 4 that is positioned above the loading units 17 will be constantly in contact with more than one line of the rollers 40 so that the loading force will be evenly distributed or transferred thereto.

A similar arrangement of rollers 40 is pressed against the top surface of the upper track formation of gripper blocks 5 by the upper loading units 19. Each of the upper loading units 19 has its lower air spring 28 mounted upon a saddle 34 having roller-carrying truck 39 pivotally attached thereto. These upper saddles 34 and trucks 39 are similarly provided with studs 30 and 36 and rollers 36A which are slidably retained by vertical channels 27 formed in the upper body structure 7. Each of the upper loading units 19 has its upper air spring 28 attached to a plate 33 which is bolted to the upper body structure 7 as is indicated in Fig. 2. In this embodiment of the invention, eighteen of these upper loading units 19 are positioned over eighteen of the lower loading units 17 along the mating portion of the lower and upper caterpillar track formations of gripper blocks 4 and 5.

As was stated above, the cable-handling engine 1 is equipped with programming means including two translatable cams 10 which are pulled through the engine 1 by endless chains 11 coincidently with a housing member 3 in order to create a moving gap between the lower and upper track formations of gripper blocks 4 and 5 for the purpose of providing the housing member 3 with substantially unimpeded passage through the engine 1. Each of the cams 10 has a central contour which is essentially the same as a longitudinal section of one of the housing members 3 as is indicated in Figs. 6 and 7. Since the cams 10 are employed to spread apart the mating section of the caterpillar track, their ends are tapered so as to form entry and exit ramps which are designed to move the loading units 17 and 19 with an essentially uniformly accelerated motion in a vertical direction.

Figure 8:
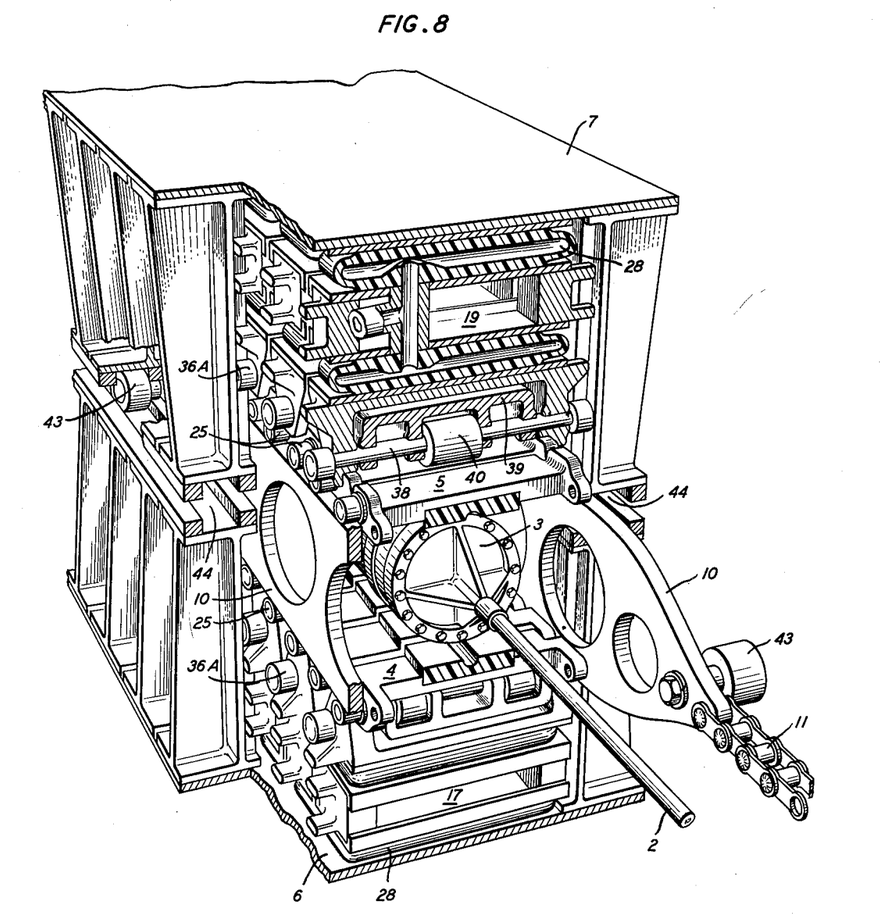
Fig. 8 is a three-dimensional view partly in section of a portion of the caterpillar cable engine showing the manner in which the lower and upper caterpillar tracks are forced apart by the cam means in order to accommodate a housing member.

In Figs. 1 and 8, it can be seen that the cams 10 are arranged for movement along either side of the parallel caterpillar tracks comprising the juxtaposed gripper blocks 4 and 5. During the movement of the cams 10, they are guided along their path of travel by means of guide rollers 43 which are rotatably attached to the ends of the cams 10. These rollers 43 are confined within rails 44 formed along the top edges of the lower chassis structure 6 and the bottom edges of the upper body structure 7. Thus, the rollers 43 function as guides or stabilizers for preventing lateral and vertical displacement of the cams 10 when they are pulled through the engine 1 by the endless chains 11. At one end of their loops, the chains 11 engage drive sprocket gears 45 while idler sprocket gears 46 engage the other end of their loops. The endless chains 11 are driven in either a forward or a reverse direction by a control system which will now be explained.

Figure 9:
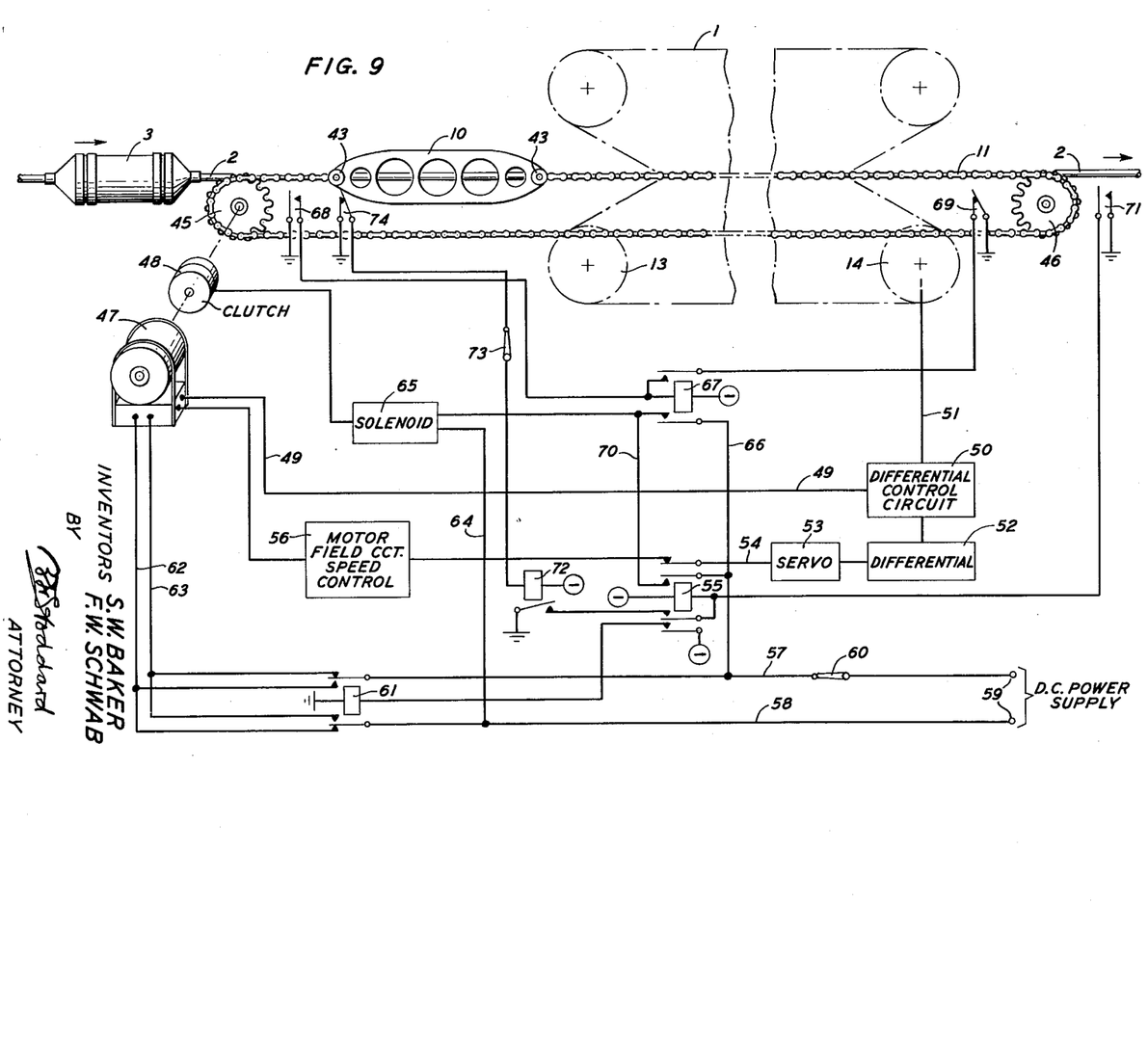
Fig. 9 is a schematic representation of the programming cam means and the associated synchronized control system with its operation-controlling trip switches.

The synchronized control system is illustrated schematically in Fig. 9 in which it is shown as including a direct current motor 47 coupled by a disc clutch 48 to the drive sprockets 45. An electric signal representing the speed of the motor 47 is derived in any suitable manner known to those skilled in the art and is transmitted over a lead 49 to a conventional differential control circuit 50 which is also supplied over a lead 51 with an electric signal indicative of the speed of the caterpillar tracks in the cable-handling engine 1. These two signals are oppositely combined in the differential control circuit 50 and the resulting difference, if any, is used to control a mechanical differential device 52 which, in turn, operates a conventional servo control system 53. The output from the servo control system 53 is applied along a lead 54 and over the released outer top armature of a relay 55 to the field circuit 56 of the motor 47 for controlling its speed in a manner well known to those skilled in the art.

Power for operating the motor 47 is supplied over leads 57 and 58 extending from a suitable source 59 of direct current. This power supply circuit includes a manually operable on-off switch 60 and the armatures of a reversing relay 61. When the relay 61 is not energized, its lower armature couples the lead 58 to a lead 62 extending to one side of the motor 47 while its upper armature connects the lead 57 to a lead 63 extending to the other side of the motor 47. This causes the motor 47 to operate in a direction for pulling the cams 10 from left to right for escorting a housing 3 through the engine 1. After the relay 61 has been energized and has operated its armatures, the power connections are reversed so that the lead 58 will be coupled to the lead 63, and the lead 57 will be joined to the lead 62 thereby causing the motor 47 to operate in the opposite direction for pulling the cams 10 from right to left for returning to their launching position.

One side of the power source 59 is connected by the lead 58 and a lead 64 to a solenoid 65 which controls the operation of the clutch 48 in any suitable manner known to those skilled in the art. The other side of the power source 59 is coupled to the solenoid 65 by two alternative parallel paths. One path extends from the lead 57 along a lead 66 and over the bottom armature of a control relay 67. The energizing circuit for the relay 67 is controlled by a sensing device represented by a trip switch 68 which is designed to be actuated by the housing member 3 as is explained more fully hereinafter. The relay 67 is also provided with a locking circuit controlled by another trip switch 69 which is also adapted to be operated by the housing structure 3. The other alternative path to the solenoid 65 extends from the power lead 57 over an armature of the relay 55 and then along a lead 70. Another armature of the relay 55 controls a circuit for energizing the reversing relay 61. The relay 55 is energized over a path including a third trip switch 71 arranged to be actuated by the housing 3. A locking circuit for the relay 55 is provided under the control of a relay 72 having an energizing circuit containing a manually operable switch 73 and a trip switch 74 which is closed by one of the cams 10 when it is in its launching position.

In operating the caterpillar cable engine 1, the first step is to insert the cable 2 into the engine 1. If the end of the cable 2 is not accessible for being threaded into the engine 1, then the cable 2 can be inserted by operating the hydraulic jacks 9 which are electrically controlled from the control console 15 and which cause the upper body structure 7 to swing open on the hinges 8. In this manner, access to the interior of the engine 1 is readily obtained. The cable 2 is then manually laid in the grooves 12 of the lower gripper blocks 4. The jacks 9 are next operated to return the upper body structure 7 to its normal position so that the upper gripper blocks 5 will engage the cable 2. Driving power is now applied to the sprocket wheels, represented by the sprocket wheels 13 and 14, for translating the lower and upper mating track formations of gripper blocks 4 and 5 concurrently in the same direction. Sufficient normal force is applied in increments along the tracks by the lower and upper loading units 17 and 19 to maintain the tracks in gripping relation with the cable 2.

When one of the rigid instrumentality housings 3, which may be a repeater, approaches the cable-handling engine 1 at appropriate intervals during the passage of the cable 2, the housing 3 will close the trip switch 68 thereby energizing the control relay 67 over an obvious circuit. This causes relay 67 to operate its armatures with its top armature closing its locking circuit extending through the normally closed trip switch 69. The operation of the bottom armature of relay 67 completes the power supply circuit to the solenoid 65 by way of the lead 66 since it is assumed that the on-off switch 60 is ordinarily closed in advance of the approach of a housing 3. Accordingly, the solenoid 65 causes the disc clutch 48 to become engaged for driving the two endless chains 11 by means of their respectively associated drive sprockets 45. Since relay 61 is not energized at this time, its armatures are released so that the power supply connections to the motor 47 are such as to cause it to drive the cams 10 from left to right. When the cams 10 move from their launching position, the normally closed trip switch 74 will be permitted to open thereby causing relay 72 to release its armature to prepare the locking circuit for relay 55.

It is to be noted that the trip switch 68 and the launching position of the cams 10 are at points which are located sufficiently in advance of the entrance to the engine 1 to enable the cams 10 to accelerate up to the same speed as the housing 3 before they enter the engine 1. During the time that the cams 10 are initially accelerating their speed, they will lead the housing 3. However, since the housing 3 is moving at a faster speed than the initial speed of the cams 10, it will catch up with the cams 10 at a preselected position in front of the engine 1 at the same time that the cams attain the cable-handling speed. From this point on, the servo control system 53 will employ its speed sensing properties to maintain the speed of the cams 10 at the same speed as the housing 3, the cable 2, and the mating section of the caterpillar tracks. Thus, the cams 10 will be translated through the engine 1 coincidently with the housing 3 at normal cable-handling speeds.

When the cams 10 and the housing 3 coincidently approach the engine 1, the tapered front ends of the cams 10 will force apart the immediately adjacent lower and upper loading units 17 and 19 in the manner illustrated in Fig. 6. During this spreading apart of the mating section of the caterpillar tracks, the flanged rollers 25 at the ends of the gripper blocks 4 and 5 will ride on the entry ramps of the cams 10 which, as was stated above, are so shaped as to cause the loading units 17 and 19 to move with an essentially uniformly accelerated motion in a vertical direction. This vertical displacement is made possible by the fact that the respectively associated pairs of air springs 28 become compressed. In addition, the directional flexibility of the pivotally mounted trucks 39 enables them to tilt about their pivot shafts 38 in the manner shown in Fig. 6 so as to conform to the contour of the cams 10. This rocking or swinging action of the trucks 39 serves to hold all of their rollers 40 in contact with their respectively associated gripper blocks 4 and 5 without relaxing the loading pressure.

After the cams 10 have escorted the housing member 3 further inside the engine 1, more of the adjacent loading units 17 and 19 will become vertically displaced so that the cams 10 and the housing 3 will become "swallowed" or enveloped inside the engine 1, as is represented in Fig. 7. During the passage of the cams 10 through the engine 1, they are guided by their rollers 43 which are confined within the rails 44. In addition, the edges of the cams 10 are in contact with the flanged rollers 25 on the gripper blocks 4 and 5, as is best seen in Fig. 8. The flanged portions of the rollers 25 function as spacing elements between the sides of the cams 10 and the ends of the gripper blocks 4 and 5.

It is to be noted that, during the passage of the cams 10 and the housing 3 through the engine 1, the directional flexibility of the pivotally mounted trucks 39 enables them to adjust their positions in conformity with the contour of the cams 10 without relaxing the load imposed by their associated air springs 28. This causes all of their rollers 40 to apply the loading pressure constantly over the surfaces of their associated gripper blocks 4 and 5. Therefore, as soon as the passage of the cams 10 permits the loading units 17 and 19 to return to their normal positions, as is shown at the left in Fig. 7, their loading pressure will be transferred at once to the cable 2.

Thus, the portions of the cable 2 immediately preceding and immediately following the cams 10 are constantly subjected to gripping pressure while traveling through the engine 1. In other words, the control exercised by the engine 1 upon the cable 2 is sustained at normal cable-handling speeds during the passage of a housing 3 since the major portion of the mating section of the caterpillar tracks is maintained in gripping relation with the cable 2. This is due to the fact that this cable-handling method utilizes the cams 10 for separating successive portion sonly of the mating track section in order to create a moving gap between the lower and upper caterpillar tracks through which a rigid housing 3 passes at a normal cable-handling speed which may, for example, be eight knots.

Finally, at the output end of the engine 1, the cams 10 and the housing 3 are "disgorged" or expelled in a manner which is the converse of their entry into the engine 1.

After a housing 3 leaves the engine 1, its departure is sensed due to the fact that it opens the normally closed trip switch 69 in the locking circuit of relay 67 which thereupon releases its armatures. The release of the bottom armature of relay 67 opens the energizing circuit of the solenoid 65 thus causing the clutch 48 to become disengaged and thereby stopping the rotation of the drive sprockets 45. The cams 10 will now cease their forward movement while the housing 3 continues to be pulled forward by the cable 2.

Shortly after this action takes place, the housing 3 meets and closes the normally open trip switch 71 thereby closing the energizing circuit for relay 55. Relay 55 will now operate its armatures and will lock up over its inner bottom armature and the released armature of relay 72. The operation of its outer top armature disconnects the servo control system 53 from the speed control circuit 56 of the motor 47. The operation of its inner top armature closes an alternative energizing circuit for the solenoid 65 extending over the lead 70. The operation of its outer bottom armature closes an obvious circuit for energizing relay 61 which consequently operates its armatures to reverse the power connections to the motor 47. This causes the motor 47 to operate in the opposite direction for pulling the cams 10 back through the engine 1. If desired, any suitable time delay means known to those skilled in the art may be included in the path extending along the lead 70 to the solenoid 65 so as to insure that the clutch 48 will not be engaged until the operation of the motor 47 has been properly reversed.

The movement of the cams 10 from right to left is in a direction opposite to that in which the gripper blocks 4 and 5 are being driven. Accordingly, the rollers 25 on the gripper blocks 4 and 5 will ride up the ramps at the left ends of the cams 10 and then down the ramps at the right ends of the cams 10 so that the gripper blocks 4 and 5 will be separated seriatim until the cams 10 emerge at the left end of the engine 1.

After coming out of the engine 1, the left end of one of the cams 10 will close the trip switch 74 thereby effecting the energization of the relay 72 which operates its armature to open the locking circuit of relay 55. Relay 55 thereupon releases its armatures with its outer top armature connecting the servo control system 53 to the speed control circuit 56 of the motor 47. The release of the inner top armature of relay 55 opens the path extending along the lead 70 to the solenoid 65 which in turn causes the clutch 48 to become disengaged so as to stop the cams 10 at their launching position. The release of the outer bottom armature of relay 55 opens the energizing circuit of relay 61 which now releases its armatures to restore the original power connections to the motor 47. Thus, the drive system is returned to its condition shown in Fig. 9.

It is to be understood that this invention has been described above with reference to a specific cable-handling engine for the purpose of explaining the principles and features of operation of the invention. It is to be further understood that the invention is not to be restricted to the particular embodiment as various modifications may be made without exceeding the scope of the invention. For example, each loading unit may comprise a smaller or larger number of air springs or some other kind of resilient means, such as metallic springs. Also, one group of loading units, such as the lower loading units 17, could be omitted provided the other group of loading units, such as the upper loading units 19, is so constructed and arranged as to be capable of a compressional displacement substantially equal to the diameter of the housing member 3. Various other types of directionally flexible load transfer means may be employed if desired. Furthermore, the drive system for the programming cams 10 may be operated by hydraulic power that is electrically controlled.

What is claimed is:

1. The method of employing a caterpillar cable engine having oppositely disposed mating tracks for handling cable provided at spaced intervals with rigid instrumentality housings of a markedly greater diameter than that of the cable, said method comprising placing a portion of said cable between said mating tracks, applying gripping force to said cable substantially continuously along the length of said cable portion enclosed by said mating tracks, and translating said tracks concurrently in the same direction, said method being characterized by the steps of producing a moving gap between said mating tracks coincidently with the passage of a rigid housing through said engine and in the same direction, sensing the departure of said housing from said engine, and effecting in response to said sensing the movement of said gap back through the engine in the opposite direction.

2. A caterpillar cable engine for handling a cable provided at spaced intervals with rigid instrumentality housings of markedly greater diameter than the cable, said engine comprising parallel caterpillar tracks faced with juxtaposed gripping blocks, resilient means for biasing said gripping blocks toward each other for gripping said cable, means for concurrently translating said tracks in the same direction, and instrumentalities for effecting the continuous passage at normal cable-handling speeds through said engine of said cable and its housings while maintaining continuous control of the cable, said instrumentalities being characterized by comprising translatable cam means having tapered entry and exit ends with a central contour essentially the same as a longitudinal section of one of said housings, and means for translating said cam means through said engine and between said parallel tracks coincidently with a housing for forcing said juxtaposed gripping blocks apart to accommodate the housing, there being a sufficient track length and number of gripping blocks to adequately grip and control the cable during the passage of a housing through the engine.

3. A caterpillar cable-handling engine comprising in combination a lower endless caterpillar track formed by a first multiplicity of gripping units, an upper endless caterpillar track formed by a second multiplicity of gripping units oppositely disposed with respect to said first gripping units, said upper track having a number of its gripping units in mating engagement with corresponding gripping units in said lower track, means for concurrently translating said mating gripping units in the same direction, and loading means for applying pressure to said lower and upper mating gripping units in a direction for enforcing said mating relationship, said loading means including a first plurality of discrete loading units individually mounted in pressure-exerting relation against the mating gripping units in said lower track and a second plurality of discrete loading units individually mounted in pressure-exerting relation against the mating gripping units in said upper track, and each of said loading units having at least one portion thereof which is compressionally displaceable in response to force exerted thereagainst, said engine being characterized by having a plurality of traveling cams normally positioned adjacent to one end of the mating tracks, guiding means for guiding each of said cams through said engine along a path of travel parallel to said mating tracks and between said oppositely disposed mating gripping units, and control means for effecting the movement of said cams along said paths whereby said first and second pluralities of loading units become compressionally displaced seriatim.

4. A caterpillar cable-handling engine for handling a cable having at spaced intervals lump-type housing structures of markedly greater diameter than the cable, said engine having mating caterpillar tracks between which a cable and its housings travel, and groups of loading units oppositely disposed with respect to said mating tracks for applying force against said tracks to maintain said tracks in gripping relation with a cable, said engine being characterized by having means for incrementally forcing said oppositely disposed loading units apart seriatim, said means including a translatable cam having at least a portion of its contour substantially the same as a longitudinal section of one of said housings, and control means for translating said cam through said engine in synchronism with a housing along a path of travel extending essentially between said oppositely disposed loading units.

5. A caterpillar cable-handling engine in accordance with claim 6 and further characterized by having guiding means for guiding said cam along said path of travel, said guiding means including a track extending through said engine along a line parallel to said mating caterpillar tracks, and an instrumentality attached to said cam and mounted for movement along said track.

6. A cable-handling engine in accordance with claim 4 and further characterized by having additional control means actuated by the departure of a housing from said engine for effecting the reverse movement of said cam back through said engine in the opposite direction.

References Cited in the file of this patent

UNITED STATES PATENTS

| 2,792,930 | Graham | May 21, 1957 |
| 2,797,798 | Hallden | July 2, 1957 |

FOREIGN PATENTS

| 572,968 | Great Britain | Oct. 31, 1945 |
| 636,595 | Germany | Oct. 12, 1936 |
| 1,103,496 | France | May 25, 1955 |

UNITED STATES PATENT OFFICE
CERTIFICATE OF CORRECTION

Patent No. 2,981,452                                        April 25, 1961

Stanley W. Baker et al.

It is hereby certified that error appears in the above numbered patent requiring correction and that the said Letters Patent should read as corrected below.

Column 14, line 35, for the claim reference numeral "6" read -- 4 --.

Signed and sealed this 19th day of September 1961.

(SEAL)
Attest:

ERNEST W. SWIDER                                    DAVID L. LADD
Attesting Officer                                        Commissioner of Patents

USCOMM-DC